(12) United States Patent
Xia et al.

(10) Patent No.: US 10,825,615 B2
(45) Date of Patent: Nov. 3, 2020

(54) HARD-SHELL FLEXIBLY-PACKAGED CAPACITOR MODULE AND SYSTEM

(71) Applicant: CRRC QINGDAO SIFANG ROLLING STOCK RESEARCH INSTITUTE CO., LTD., Qingdao (CN)

(72) Inventors: Guangchun Xia, Qingdao (CN); Yajun Liang, Qingdao (CN); Lipeng Shao, Qingdao (CN); Luzhou Liu, Qingdao (CN); Qiang Zhou, Qingdao (CN); Dongdong Feng, Qingdao (CN)

(73) Assignee: CRRC QINGDAO SIFANG ROLLING STOCK RESEARCH INSTITUTE CO., LTD., Qingdao (CN)

( * ) Notice: Subject to any disclaimer, the term of this patent is extended or adjusted under 35 U.S.C. 154(b) by 0 days.

(21) Appl. No.: 16/718,089

(22) Filed: Dec. 17, 2019

(65) Prior Publication Data

US 2020/0126734 A1 Apr. 23, 2020

Related U.S. Application Data

(63) Continuation of application No. PCT/CN2017/100152, filed on Sep. 1, 2017.

(30) Foreign Application Priority Data

Jul. 21, 2017 (CN) .......................... 2017 1 0600082

(51) Int. Cl.
*H01G 11/10* (2013.01)
*H01G 11/12* (2013.01)
*H01G 11/82* (2013.01)

(52) U.S. Cl.
CPC ............. *H01G 11/82* (2013.01); *H01G 11/10* (2013.01); *H01G 11/12* (2013.01)

(58) Field of Classification Search
CPC ......... H01G 11/82; H01G 11/12; H01G 11/10
(Continued)

(56) References Cited

U.S. PATENT DOCUMENTS

| 5,422,200 A | 6/1995 | Hope et al. | |
|---|---|---|---|
| 2007/0184341 A1* | 8/2007 | Yoon ................... | H01M 2/0207 429/152 |

(Continued)

FOREIGN PATENT DOCUMENTS

| CN | 101540386 A | 9/2009 |
|---|---|---|
| CN | 101803068 A | 8/2010 |

(Continued)

OTHER PUBLICATIONS

The International Search Report of corresponding International application No. PCT/CN2017/100152, dated Mar. 28, 2018.
(Continued)

*Primary Examiner* — Arun Ramaswamy
(74) *Attorney, Agent, or Firm* — J.C. Patents

(57) ABSTRACT

The application discloses a hard-shell flexibly-packaged capacitor module and a system, including: a flexibly-packaged individual capacitor and fastening plates, including a first fastening plate and a second fastening plate being oppositely mounted and connected in clasped manner; and, supports including a first support and a second support being oppositely mounted and used for connecting the individual positive and negative tabs respectively; and the two supports and the two fastening plates being enclosed to form a closed structure for accommodating the individual capacitor. Individual capacitors and a silica gel insulator are assembled inside the fastening plates clasped with each other, i.e. a "hard-shell" structure is provided for the individual capacitors; the hard-shell flexibly-packaged capacitor module is assembled as a whole, and multiple capacitor modules are connected in series or in parallel to form a required capacitor system, it is good in expansibility and easy to assemble.

16 Claims, 15 Drawing Sheets

(58) Field of Classification Search
USPC .............. 361/502, 503, 517, 535, 541, 537
See application file for complete search history.

(56) References Cited

U.S. PATENT DOCUMENTS

| | | | |
|---|---|---|---|
| 2009/0208828 A1* | 8/2009 | Kanai | H01M 6/46 |
| | | | 429/120 |
| 2009/0239142 A1* | 9/2009 | Suto | H01M 2/0212 |
| | | | 429/177 |
| 2010/0075220 A1* | 3/2010 | Heo | H01M 2/0275 |
| | | | 429/163 |

FOREIGN PATENT DOCUMENTS

| | | |
|---|---|---|
| CN | 102306739 A | 1/2012 |
| CN | 203983363 U | 12/2014 |
| CN | 204668377 U | 9/2015 |
| CN | 205810902 U | 12/2016 |
| CN | 106299188 A | 1/2017 |
| CN | 205881968 U | 1/2017 |
| EP | 0946954 | 6/1999 |
| KR | 101345600 | 1/2014 |
| KR | 1020120026449 | 7/2016 |

OTHER PUBLICATIONS

The Chinese Search Report of corresponding Chinese application No. 201710600082.7, dated May 28, 2018.
First Office Action and Supplementary Partial European Search Report for EP 17917986.
First Office Action of corresponding KR application.

* cited by examiner

ND SYSTEM

HARD-SHELL FLEXIBLY-PACKAGED CAPACITOR MODULE AND SYSTEM

CROSS-REFERENCE TO RELATED APPLICATIONS

The present application is a continuation application of International Application No. PCT/CN2017/100152 filed on Sep. 1, 2017 which claims priority to Chinese Patent Application No. 201710600082.7 filed on Jul. 21, 2017. The disclosures of the aforementioned applications are hereby incorporated by reference in their entireties.

TECHNICAL FIELD

The present application relates to the technical field of energy storage devices, and in particular to a hard-shell flexibly-packaged capacitor module and system.

BACKGROUND OF THE PRESENT INVENTION

As one of novel energy storage elements, lithium capacitors have many advantages such as high power density, long cycle life and safe operation. For the lithium capacitors, compared with conventional double electric layer supercapacitors, at the equivalent power density, the mass energy density is increased by about 3 times, and the volume energy density is increased by about 6 times; and, compared with conventional batteries, the energy density is approximately equivalent to that of the lead acid batteries, the power density is 5 to 10 times of that of the lithium ion batteries, and the low-temperature characteristics are far better than that of the above-mentioned batteries.

In the prior art, the biggest advantage of the flexibly-packaged lithium capacitors is high grouping efficiency, but the grouping process is complicated, and accessories such as clip board need to be designed to fix it. Moreover, since the outer surfaces of the flexibly-packaged lithium capacitors are provided with a PP film with low wear resistance and resistance to acid and alkali corrosion, additional protection is required during assembly, resulting in low assembly efficiency.

Due to low "flexibility" of the flexibly-packaged lithium capacitor module, the module is to be redesigned for different voltages and capacity levels, so that the compatibility of the module in the system is low, and it is disadvantageous for the capacity expansion and modular design of the system.

During manufacturing the flexibly-packaged lithium capacitor packs, a laser welding technology is often used. Although the assembly efficiency is improved, it is inconvenient for subsequent overhaul and maintenance. Particularly during the replacement of individual capacitors and the capacity expansion of the module, it is unable to disassemble individual capacitors, resulting in resource waste.

Conventional flexibly-packaged capacitor packs are basically fixed in the box of the system in a bolt connection manner. In case of sudden acceleration or braking, this connection mode has a risk of clipping off bolts. Moreover, fixed anchors are required by the bolt connection, so the space in the box body of the system is occupied, and the grouping efficiency in the system level is reduced.

SUMMARY OF THE PRESENT INVENTION

In view of the above technical defects, an objective of the present application is to provide a hard-shell flexibly-packaged capacitor module and system, which are high in expansibility and easy to assemble.

An implementation of the present application provides a hard-shell flexibly-packaged capacitor module, including: a flexibly-packaged individual capacitor which is provided with individual tabs, the individual tabs including an individual positive tab and an individual negative tab arranged on two sides; fastening plates including a first fastening plate and a second fastening plate, the two fastening plates being oppositely mounted, and the two fastening plates being connected in a mutually clasped manner; and, supports including a first support and a second support, the two supports being oppositely mounted, the two supports being used for connecting the individual positive tab and the individual negative tab, respectively, and the two supports and the two fastening plates being enclosed to form a closed structure for accommodating the flexibly-packaged individual capacitor.

As a preferred implementation, the capacitor module includes multiple flexibly-packaged individual capacitors connected in parallel; bent portions of individual positive tabs of adjacent flexibly-packaged individual capacitors are embraced with each other to form a parallel positive terminal of the capacitor module; and, bent portions of individual negative tabs of adjacent flexibly-packaged individual capacitors are embraced with each other to form a parallel negative terminal of the capacitor module.

As a preferred implementation, the capacitor module includes two flexibly-packaged individual capacitors connected in parallel; bent portions of the individual positive tabs of the two flexibly-packaged individual capacitors are embraced with each other to form a 2-parallel positive terminal of the capacitor module; and, bent portions of the individual negative tabs of the two flexibly-packaged individual capacitors are embraced with each other to form a 2-parallel negative terminal of the capacitor module.

As a preferred implementation, the capacitor module includes multiple flexibly-packaged individual capacitors connected in series; bent portion of the individual positive tab and bent portion of the individual negative tab of adjacent flexibly-packaged individual capacitors are embraced with each other to form a serial connection terminal of the capacitor module; and, bent portion of the remaining individual positive tab and bent portion of the remaining individual negative tab are back-to-back arranged to serve as a serial positive terminal of the capacitor module and a serial negative terminal of the capacitor module, respectively.

As a preferred implementation, the capacitor module includes two flexibly-packaged individual capacitors connected in series; the bent portion of one individual positive tab and the bent portion of one individual negative tab of the two flexibly-packaged individual capacitors are embraced with each other to form a 2-serial connection terminal of the capacitor module; and, the bent portion of the remaining individual positive tab and the bent portion of the remaining individual negative tab of the two flexibly-packaged individual capacitors are back-to-back arranged to serve as a 2-serial positive terminal of the capacitor module and a 2-serial negative terminal of the capacitor module, respectively.

As a preferred implementation, two stepped surfaces are arranged on the support, for separately accommodating the serial negative terminal and the serial positive terminal. Preferably, the stepped surfaces are made of an insulating material.

As a preferred implementation, the capacitor module further includes a silica gel insulator; the silica gel insulator includes heat conducting and insulating silica gel pads and a flame-retardant and insulating silica gel guard edge; the silica gel guard edge is arranged on an outer surface of an end portion of an outer layer flexibly-packaged individual capacitor; and, the silica gel pads are arranged at two outer surfaces of the outer layer flexibly-packaged individual capacitors and arranged between adjacent flexibly-packaged individual capacitors.

As a preferred implementation, the silica gel guard edge is arranged on an outer surface of an edge of the outer layer flexibly-packaged individual capacitor; and an embedding opening, through which the edge of the flexibly-packaged individual capacitor is embedded, is formed on the silica gel guard edge.

As a preferred implementation, the silica gel guard edge is of a U-shaped structure, and two silica gel guard edges are arranged at two ends of each of the flexibly-packaged individual capacitors.

As a preferred implementation, the two fastening plates are connected in a mutually clasped manner, specifically: a first hook body protruding towards the second fastening plate side is arranged inside the first fastening plate, a second hook body protruding towards the first fastening plate side is correspondingly arranged inside the second fastening plate, and the first hook body and the second hook body can be hooked and clasped with each other.

As a preferred implementation, a horizontal extend portion is arranged on an edge of the first fastening plate, and a guide protrusion matched with the extend portion is arranged on an edge of the second fastening plate; and, when the first hook body and the second hook body are hooking with each other, the guide protrusion can horizontally move along the horizontal extend portion.

As a preferred implementation, multiple end fixation portions are arranged on the fastening plates. Each end fixation portion at least includes a first cavity and a second cavity, and two ends of the flexibly-packaged individual capacitors are embedded into the first cavity and the second cavity, respectively. A first protrusion block is arranged at upper and lower ends of the first fastening plate, respectively, and the first cavity is formed between the first protrusion block and the first hook body; and, a second protrusion block is arranged at upper and lower ends of the second fastening plate, respectively, and the second cavity is formed between the second protrusion block and the second hook body.

As a preferred implementation, the supports are made of an insulating material.

As a preferred implementation, tab through holes are formed on each support, and bent portions of the individual tabs can pass through the tab through holes and extend out from the tab through holes.

As a preferred implementation, a fixation holes is formed at positions, corresponding to a hole, on each support, after the support is mounted; and the hole and the fixation hole are connected through a connector.

As a preferred implementation, a metal block is further arranged between two adjacent tab through holes; the metal block is superposed with the bent portions of two individual tabs embraced with each other, and the metal block is wrapped on the inner side of the bent portions.

As a preferred implementation, an accommodating groove, in which the metal block is accommodated, is formed on each support. In this case, preferably, the fixation hole is formed on the metal block to fix the individual tabs onto the support.

A second implementation of the present application provides a hard-shell flexibly-packaged capacitor system, including a shell, and a hard-shell flexibly-packaged capacitor module arranged inside the shell, wherein the hard-shell flexibly-packaged capacitor module is the capacitor module described above.

As a preferred implementation, the capacitor system includes multiple capacitor modules which are arranged in the shell in multiple rows and multiple columns.

Compared with the prior art, the present application has the following beneficial effects.

(1) In the hard-shell flexibly-packaged capacitor module provided by the present application, flexibly-packaged individual capacitors and a silica gel insulator are assembled inside the fastening plates that are clasped with each other. That is, a "hard-shell" structure is additionally provided for the flexibly-packaged individual capacitors. The hard-shell flexibly-packaged capacitor module is assembled as a whole, and multiple hard-shell flexibly-packaged capacitor modules are connected in series or in parallel to form a required hard-shell flexibly-packaged capacitor system, so that it is good in expansibility and easy to assemble.

(2) In the hard-shell flexibly-packaged capacitor module, the fastening plates are provided with a first hook body and a second hook body that can be hooked and clamped with each other, and are also provided with a guide protrusion and a horizontal extend portion for playing a guide role during the assembly process of the fastening plates, so that the relative positions of the two fastening plates can be adjusted by the guide protrusion, and it is convenient for subsequently positioning and mounting the supports.

(3) In the hard-shell flexibly-packaged capacitor system, multiple hard-shell flexibly-packaged capacitor modules can be arranged in multiple rows and multiple columns, so that the space occupied by the capacitor modules is reduced.

in which, 1 flexibly-packaged individual capacitor; 11 individual tab; 111 individual positive tab; 112 individual negative tab; 113 bent portion of the individual positive tab; 114 bent portion of the individual negative tab; 12 hole; 13 serial connection terminal of the capacitor module; 14 serial negative terminal of the capacitor module; 15 serial positive terminal of the capacitor module; 16 parallel positive terminal of the capacitor module; 2 silica gel insulator; 21 heat conducting and insulating silica gel pad; 22 flame-retardant and insulating silica gel guard edge; 221 embedding opening; 3 fastening plate; 31 first fastening plate; 311 first hook body; 312 horizontal extend portion; 313 first cavity; 314 first protrusion block; 32 second fastening plate; 321 second hook body; 322 guide protrusion; 323 second cavity; 324 second protrusion block; 4 support; 41 first support; 42 second support; 411 tab through hole; 412 metal block; 413 fixation hole; 414 accommodating groove; 415 stepped surface; 5 hard-shell flexibly-packaged capacitor module; 6 upper cover plate; 7 lower shell; 8 positive output terminal of the system; 9 negative output terminal of the system; 10 copper bar; 17 slave control board; and, 18 upright column.

DETAILED DESCRIPTION OF THE PRESENT INVENTION

In order to make the objectives, technical solutions and advantages of the implementations of the present application clearer, the technical solutions in the implementations of the present application will be described below clearly and completely with reference to the accompanying drawings in the implementations of the present application.

Figure 1:
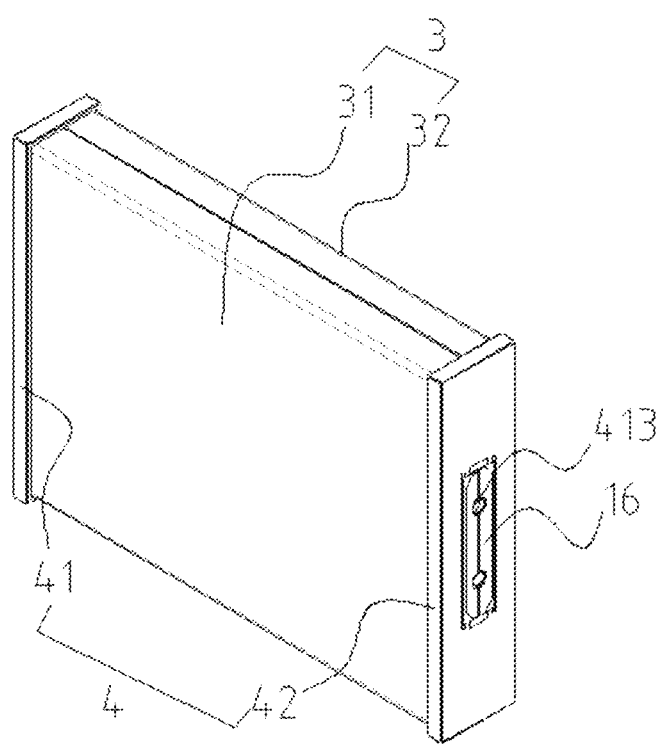
FIG. 1 is a front perspective view of a first implementation of the capacitor module.

The following description is given based on the orientations shown in FIG. 1. The upper, lower, left and right sides in FIG. 1 are the upper, lower, left and right sides in the description. The horizontal direction in FIG. 1 points to a transverse direction of the capacitor module, the vertical direction in FIG. 1 points to a vertical direction of the capacitor module, the front direction in FIG. 1 points to the front end of the capacitor module, and the direction opposite to the front direction in FIG. 1 points to the rear end of the capacitor module. In FIGS. 1-12, two sides of the flexibly-packaged individual capacitor refer to left and right sides, and two ends thereof refer to upper and lower ends, unless otherwise specified.

Referring to FIGS. 1-12, an implementation of the present application provides a hard-shell flexibly-packaged capacitor module (also referred to as a capacitor module hereinafter), including at least one flexibly-packaged individual capacitor 1. Multiple flexibly-packaged individual capacitors 1 may be combined of a 1-parallel, 2-parallel . . . n-parallel structure, or a 1-serial, 2-serial . . . n-serial structure. It is to be noted that, considering the actual processing economy and assembly manufacturability, a 1-parallel, 2-parallel or 3-parallel structure and a 1-serial, 2-serial or 3-serial structure is generally used. For the n-parallel or n-serial structure, it can be obtained by combining the 1-parallel, 2-parallel or 3-parallel structure and the 1-serial, 2-serial or 3-serial structure.

The flexibly-packaged individual capacitor 1 is provided with individual tabs 11. The individual tabs 11 includes an individual positive tab 111 and an individual negative tab 112, which are arranged on two sides of the flexibly-packaged individual capacitor 1, respectively. The individual positive tab 111 and the individual negative tab 112 have a bent portion 113 and a bent portion 114, respectively.

Hole(s) 12 for fixing the individual tabs 11 is/are formed on the bent portions 113 and 114.

Figure 2:
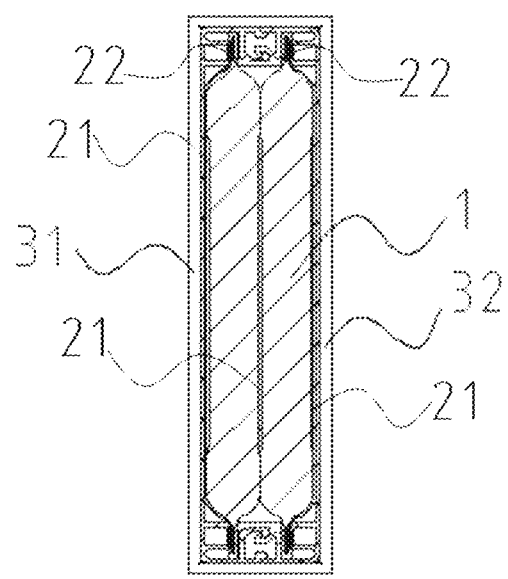
FIG. 2 is a sectional view of FIG. 1 in a longitudinal direction.
Figure 3:
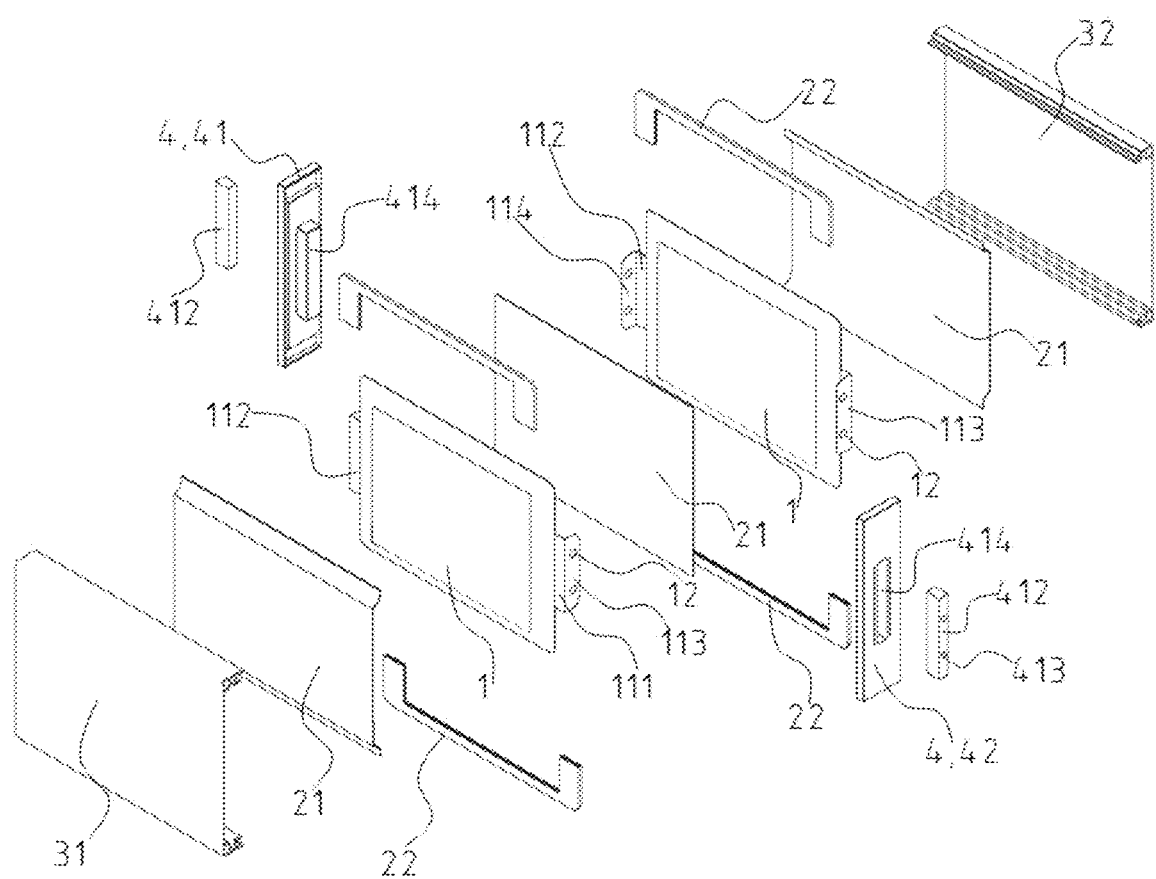
FIG. 3 is an exploded view of FIG. 1.
Figure 4:
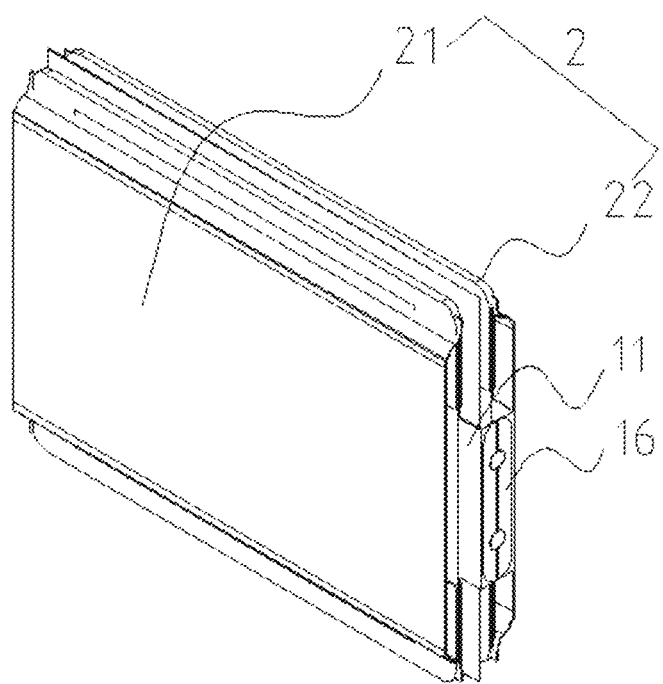
FIG. 4 is a front perspective view of a second implementation of the capacitor module.
Figure 5:
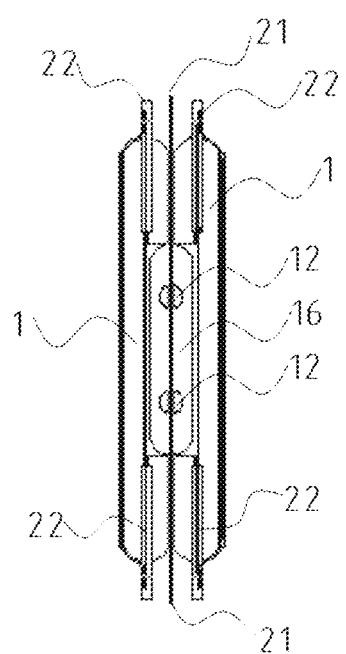
FIG. 5 is a side view of FIG. 4.

As a preferred implementation, referring to FIGS. 1-7, when multiple flexibly-packaged individual capacitors 1 are connected in parallel, the bent portions 113 of the individual positive tabs of adjacent flexibly-packaged individual capacitors 1 are embraced with each other, as shown in FIGS. 4 and 5; the holes 12 on the individual positive tabs of adjacent flexibly-packaged individual capacitors 1 are corresponding with each other and inserted together; to form a parallel positive terminal 16 of the capacitor module; and, the bent portions 114 of the individual negative tabs of adjacent flexibly-packaged individual capacitors 1 are embraced with each other, and the holes 12 on the individual negative tabs of adjacent flexibly-packaged individual capacitors 1 are correspondingly with each other and inserted together; to form a parallel negative terminal of the capacitor module. In FIGS. 1 and 4, the parallel negative terminal is not shown since they are located on the left side and occluded, but can be partially shown in FIG. 6. The structure of the parallel negative terminal is identical or similar to that of the parallel positive terminals 16. In this implementation, although only two sets of flexibly-packaged individual capacitors are shown to be connected in parallel, but the protection scope of the present invention is not limited thereto, and there may be one or more sets of flexibly-packaged individual capacitors.

Figure 10:
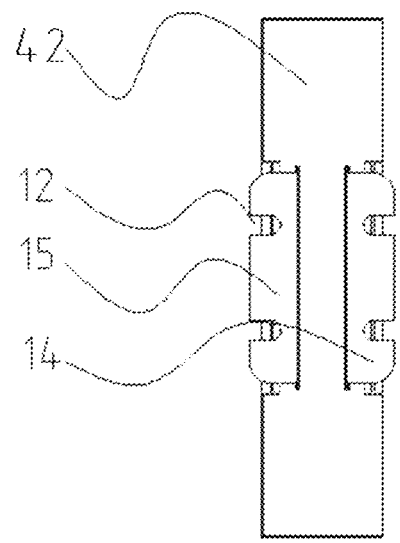
FIG. 10 is a right view of FIG. 8.
Figure 11:
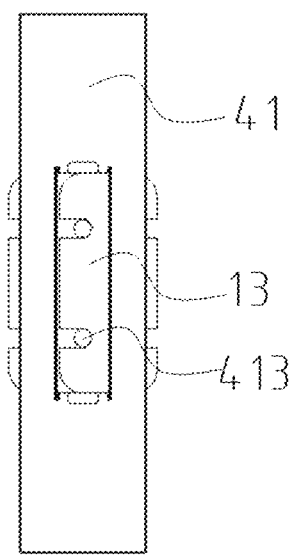
FIG. 11 is a left view of FIG. 8.
Figure 12:
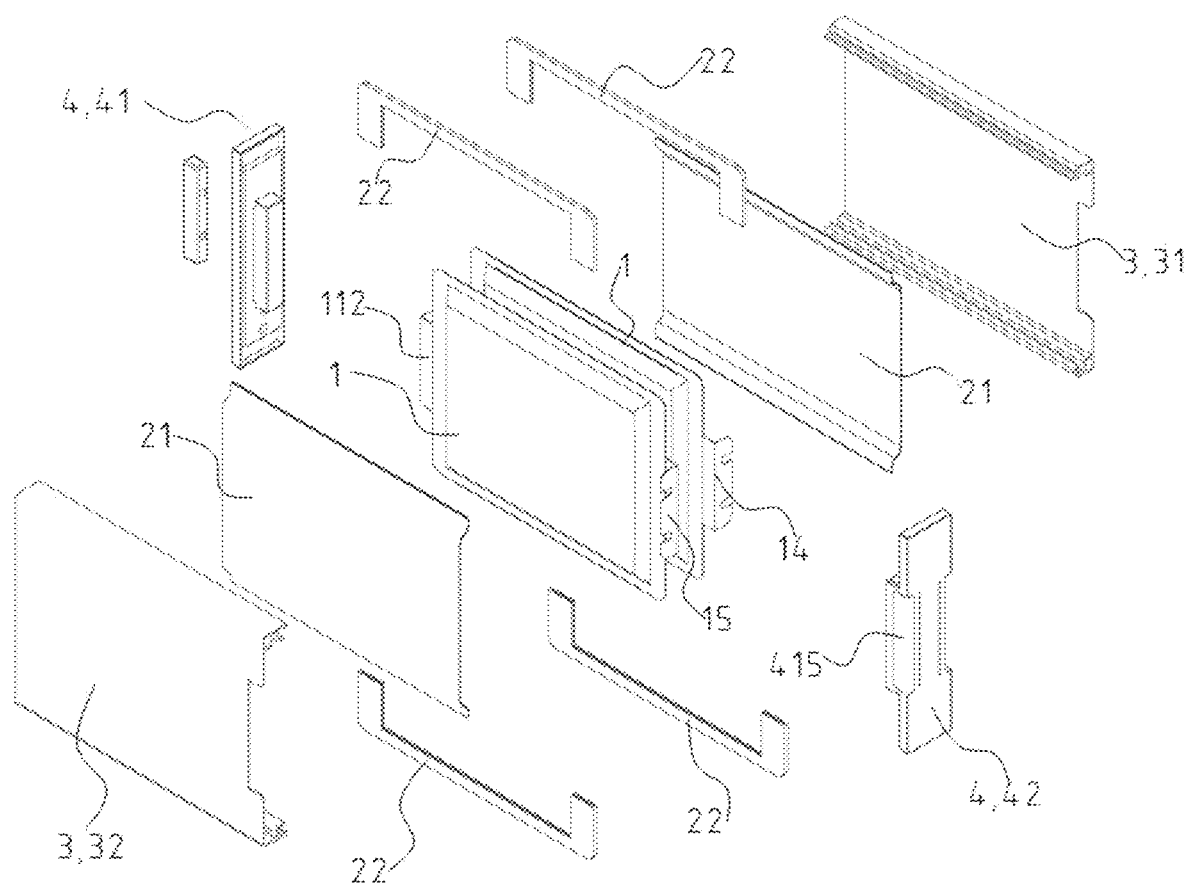
FIG. 12 is an exploded view of FIG. 8.
Figure 13:
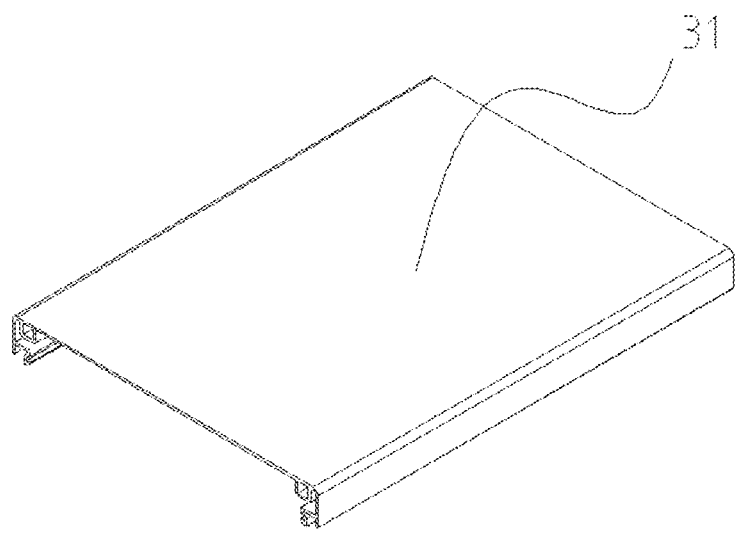
FIG. 13 is a perspective view of the first fastening plate.
Figure 14:
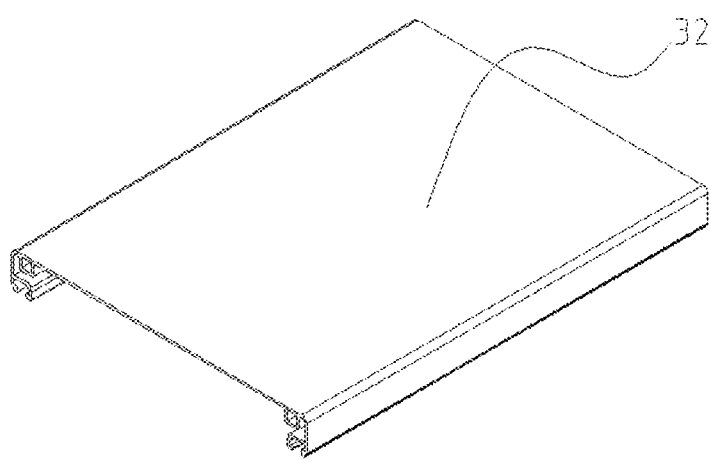
FIG. 14 is a perspective view of the second fastening plate.

As a preferred implementation, referring to FIGS. 8-12, when multiple flexibly-packaged individual capacitors 1 are connected in series, the bent portion 113 of the individual positive tab and the bent portion 114 of the individual negative tab of adjacent flexibly-packaged individual capacitors 1 are embraced with each other, and the hole(s) 12 on the individual positive tab and the hole(s) 12 on the individual negative tab of adjacent flexibly-packaged individual capacitors 1 are corresponding inserted with each other and inserted together; to form a serial connection terminal 13 of the capacitor module. As shown in FIGS. 11 and 12, the structure may be identical or similar to the structure described in the above parallel-connection implementation. Meanwhile, the bent portion of an unconnected individual tab of the first flexibly-packaged individual capacitor 1 and the bent portion of an unconnected individual tab of the $n^{th}$ flexibly-packaged individual capacitor 1, i.e., bent portion of the remaining individual positive tab 111 and bent portion of the remaining individual negative tab 112 of outer layer flexibly-packaged individual capacitors 1, are back-to-back arranged to serve as a serial positive terminal 15 of the capacitor module and a serial negative terminal 14 of the capacitor module, respectively, as shown in FIGS. 10 and 12.

In this implementation, although only two sets of flexibly-packaged individual capacitors are shown to be connected in series, the protection scope of the present invention is not limited thereto, and there may be one or more sets of flexibly-packaged individual capacitors. The outer layer flexibly-packaged individual capacitors refer to the individual capacitors in the outermost layer when multiple individual capacitors are arranged in series or in parallel. For example, for one individual capacitor, the individual capacitor itself is an outer layer flexibly-packaged individual capacitor; for two individual capacitors connected in parallel or in series, the two individual capacitors are outer layer flexibly-packaged individual capacitors; for three individual capacitors connected in parallel or in series, two individual capacitors in the outer layer are outer layer flexibly-packaged individual capacitors, and the individual capacitor in the middle layer is an inner layer flexibly-packaged individual capacitor; and, other situations can be deduced by that analogy.

As a preferred implementation, referring to FIGS. 4-7, the capacitor module may further include a silica gel insulator 2 which specifically includes heat conducting and insulating silica gel pads 21 (also referred to as silica gel pads 21 hereinafter) and a flame-retardant and insulating silica gel guard edge 22 (also referred to as silica gel guard edge 22 hereinafter). The silica gel guard edge 22 is arranged on an outer surface of an end portion of the outer layer flexibly-packaged individual capacitor 1, and tightly fitted to the outer surface of the end portion of the outer layer flexibly-packaged individual capacitor 1 to provide insulation protection to the end portion of the outer layer flexibly-packaged individual capacitor 1, as shown in FIGS. 4 and 5. The silica gel pads 21 are fitted to two surfaces of the outer layer flexibly-packaged individual capacitors 1, respectively, that is, the silica gel pads 21 are arranged on outer sides of the silica gel guard edges 22, to provide heat conduction and insulation protection to the whole outer layer flexibly-packaged individual capacitors 1. That is, two silica gel pads 21 are arranged on two outer surfaces of the capacitor module.

Figure 6:
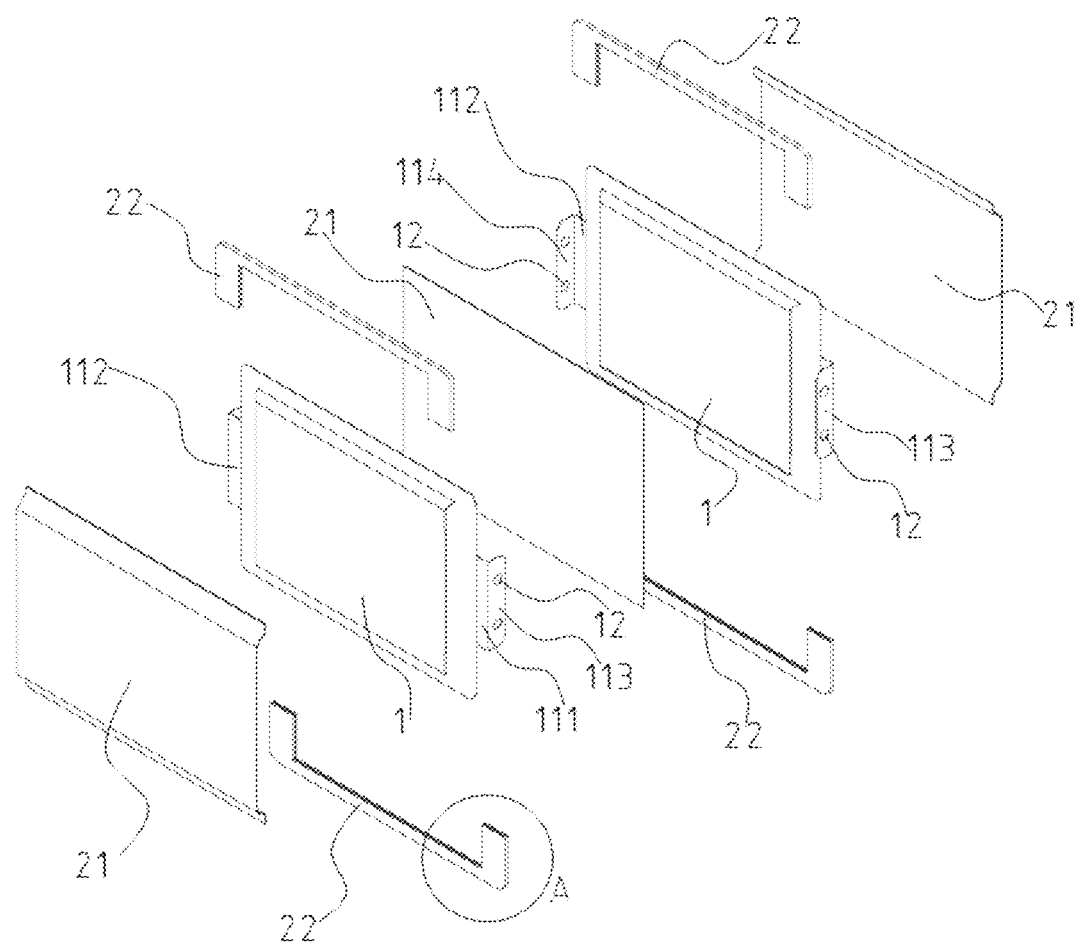
FIG. 6 is an exploded view of FIG. 4.
Figure 7:
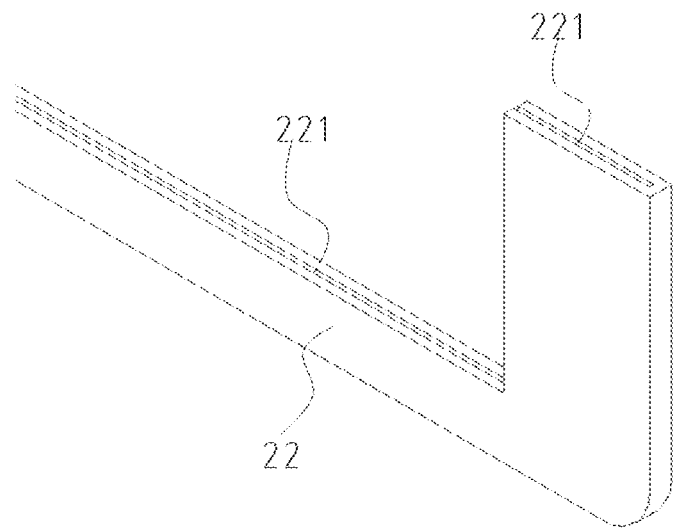
FIG. 7 is an enlarged view of part A in FIG. 6.
Figure 8:
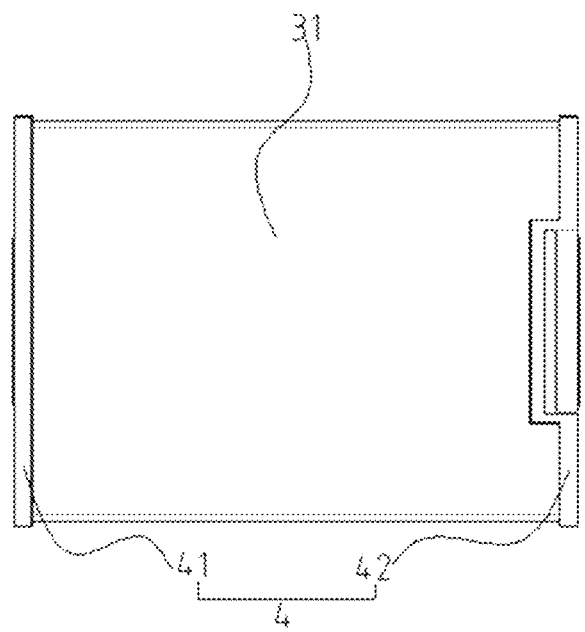
FIG. 8 is a front view of a third implementation of the capacitor module.
Figure 9:
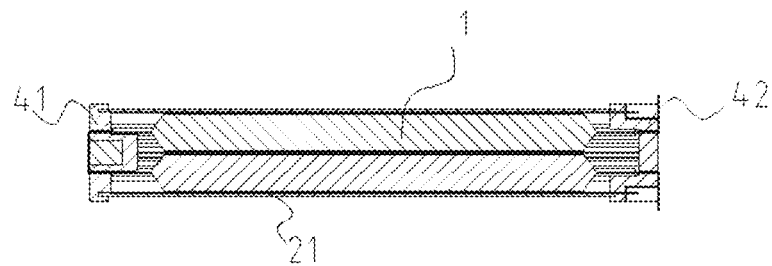
FIG. 9 is a sectional view of FIG. 8 in a transverse direction.

Specifically, as shown in FIGS. 6 and 7, the silica gel guard edge 22 is arranged on an outer surface of an edge of the outer layer flexibly-packaged individual capacitors 1; and an embedding opening 221, through which the edge of the flexibly-packaged individual capacitor 1 is embedded for protection, is formed on the silica gel guard edge 22. As for the individual tabs 11 which are of a protruded structure, it is not considered to provide the silica gel guard edges 22. As shown in FIG. 6, the silica gel guard edge 22 may be of a U-shaped structure, and two ends of each flexibly-packaged individual capacitor 1 can be provided with a silica gel guard edge 22, respectively, that is two at upper and lower.

Here, it is to be noted that, for the 2-parallel to n-parallel structures and the 2-serial to n-serial structures, preferably, silica gel pads 21 are arranged between adjacent flexibly-packaged packaged individual capacitors 1, that is, a silica gel pad 21 is arranged between the inner layer flexibly-packaged individual capacitors or between the inner layer flexibly-packaged individual capacitor and the outer layer flexibly-packaged individual capacitor, to enhance the insulation and voltage resistance of the whole capacitor module. Meanwhile, the silica gel pads 21 are allowed to come into close contact with the inner layer flexibly-packaged individual capacitors 1, so that a part of heat generated by the inner layer flexibly-packaged individual capacitors 1 can be quickly transferred to the outside air, and the effects similar to that of heat dissipating fins are achieved.

In conclusion, the silicon pads 21 are arranged in at least two ways. As shown in FIG. 12, two silicon pads 21 are arranged on two outer surfaces of the outer layer flexibly-packaged individual capacitors 1; or, as shown in FIGS. 3 and 6, two silica gel pads 21 are arranged on the two outer surfaces, and one silica gel pad 21 is also arranged between two adjacent flexibly-packaged individual capacitors 1.

As a preferred implementation, referring to FIGS. 1-3 and FIGS. 8-12, the capacitor module further includes fastening plates 3. The fastening plates 3 are used for applying a certain pre-tensioning force to the serial structure or parallel structure consisting of multiple flexibly-packaged individual capacitors 1, and fixing the flexibly-packaged individual capacitors 1 in a surface-to-surface contact manner.

The fastening plates 3 include a first fastening plate 31 and a second fastening plate 32. The first fastening plate 31 and the second fastening plate 32 are oppositely mounted, and the two fastening plates 3 are connected in a mutually clasped manner. The flexibly-packaged individual capacitors 1, or the flexibly-packaged individual capacitors 1 and the silica gel insulator 2 after assembled, are arranged in a mounting space formed by the two fastening plates 3.

As a preferred implementation, referring to FIGS. 13-16, a first hook body 311 protruding towards the second fastening plate 32 side is arranged inside the first fastening plate 31, a second hook body 321 protruding towards the first fastening plate 31 side is correspondingly arranged inside the second fastening plate 32, and the first hook body 311 and the second hook body 321 can be hooked and clamped with each other. A horizontal extend portion 312 is arranged on upper and lower portions of the first fastening plate 31, respectively; and, a guide protrusion 322 matched with the extend portion 312 is arranged on upper and lower portions of the second fastening plate 32, respectively. When the first hook body 311 and the second hook body 321 of the two fastening plates 3 are hooked with each other, the guide protrusions 32 can horizontally move along the horizontal extend portions 312. That is, the guide protrusions 322 play a guide role during the assembly process of the two fastening plates 3. The relative positions of the two fastening plates 3 can be adjusted by the guide protrusions 322, so it is convenient for subsequently positioning and mounting the supports.

Further, to realize the clamping and fixation of the flexibly-packaged individual capacitors 1 in the inner side, end fixation portions are arranged on the first fastening plate 31 and the second fastening plate 32, and the flexibly-packaged individual capacitors 1 in the inner side are clamped with the two fastening plates 3 through the end fixation portions to improve the mounting stability of the flexibly-packaged individual capacitors 1.

As a preferred implementation, the end fixation portions includes a first cavity 313 and a second cavity 323, and ends of the flexibly-packaged individual capacitors 1 are embedded into the first cavity 313 and the second cavity 323 (as shown in FIG. 2).

Figure 15:
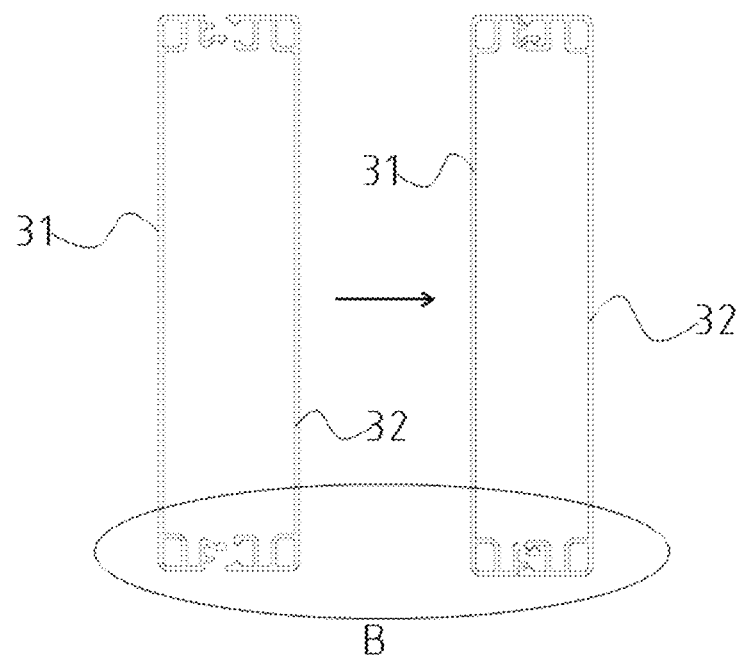
FIG. 15 is a combined view of the fastening plates.
Figure 16:
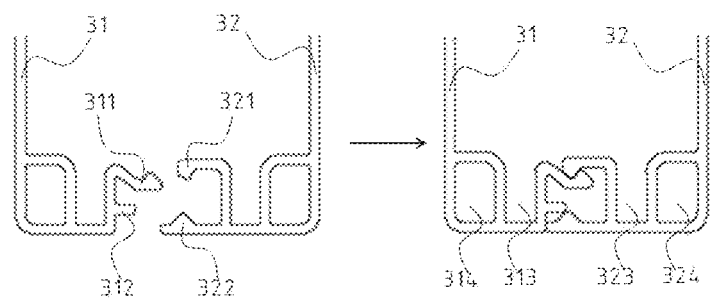
FIG. 16 is an enlarged view of part B in FIG. 14.

As a preferred implementation, a first protrusion block 314 is arranged on a side of the first fastening plate 31, i.e., at upper and lower ends of the side of the first fastening plate 31 respectively in FIGS. 15 and 16; the first cavity 313 for accommodating the end of the flexibly-packaged individual capacitor 1 is formed between the first protrusion block 314 and the first hook body 311, and the end of the flexibly-packaged individual capacitor 1 is embedded into the first cavity 313; and, a second protrusion block 324 is arranged on a side of the second fastening plate 32, i.e., at upper and lower ends of the side of the second fastening plate 32 respectively in FIGS. 15 and 16; the second cavity 323 for accommodating the end of the flexibly-packaged individual capacitor 1 is formed between the second protrusion block 324 and the second hook body 321, and end of adjacent flexibly-packaged individual capacitor 1 is embedded into the second cavity 323.

Figure 17:
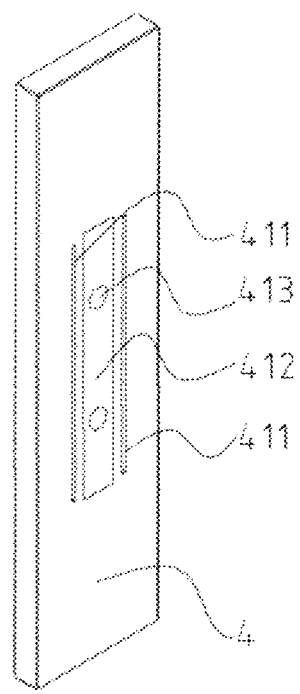
FIG. 17 is a schematic structure diagram of the support.

As a preferred implementation, referring to FIG. 17, supports 4 are used for supporting and fixing the individual positive tab 111 and the individual negative tab 112. As an implementation of the capacitor module of the present application, the supports 4 include a first support 41 and a second support 42. The two supports 4 are oppositely mounted, and the two supports 4 and the two fastening plates 3 are enclosed to form a closed structure for wrapping the flexibly-packaged individual capacitors 1.

As a preferred implementation, the supports 4 are made of an insulating material.

As a preferred implementation, tab through holes 411 are formed on each support 4. The bent portions of the individual tabs 11 can pass through the tab through holes 411 and extend out from the tab through holes 411.

Since the individual tabs 11 are generally made of copper or aluminum and are relatively soft, during the assembly process, the individual tabs 11 can first pass through the tab through holes 411 and be then bent to form bent portions 113 and 114.

A fixation hole 413 is formed at position, corresponding to the hole(s) 12, on each support 4 after the support 4 is mounted. The hole(s) 12 and the fixation hole 413 are connected through a connector. The connector may be conventional connectors such as bolts or pins. Through the above connection, the supports 4 and the individual tabs 11 can be fixed together.

As a preferred implementation, as shown in FIGS. 3, 12 and 17, a metal block 412 may be further arranged between two adjacent tab through holes 411, the metal block 412 is superposed with the bent portions 113 or 114 of two individual tabs embraced with each other, and the metal block 412 is wrapped in an inner side of the bent portions. An accommodating groove 414, in which the metal block 412 is accommodated, is formed on each support 4. In this case, the fixation hole 413 may be formed on the metal block 412 to fix the individual tabs 11 onto the support 4.

The use of the metal block 412 can reduce the current resistance between two individual tabs 11 clasped with each other, so it is advantageous for circuit circulation of the capacitor module.

Since two parallel flexibly-packaged individual capacitors 1 or two serial flexibly-packaged individual capacitors 1 are widely used in practical applications and convenient to assemble, as a preferred implementation of the present application, a hard-shell flexibly-packaged capacitor module consisting of two parallel flexibly-packaged individual capacitors 1 and a hard-shell flexibly-packaged capacitor module consisting of two serial flexibly-packaged individual capacitors 1 will be described respectively below as examples, but the present application is not limited thereto.

(1) Two Parallel Flexibly-Packaged Individual Capacitors

With continued reference to FIGS. 1-7, when two flexibly-packaged individual capacitors 1 are connected in parallel, that is, two parallel flexibly-packaged individual capacitors 1, the bent portions 113 of the individual positive tabs of the two flexibly-packaged individual capacitors 1 are embraced with each other to form a capacitor module two-parallel positive terminal, as shown in FIGS. 4 and 5; and, the bent portion 114 of the individual negative tabs of the two flexibly-packaged individual capacitors 1 are embraced with each other to form a capacitor module two-parallel negative terminal (not shown).

(2) Two Serial Flexibly-Packaged Individual Capacitors

With continued reference to FIGS. 8-12, when two flexibly-packaged capacitor modules 1 are connected in series, that is, two serial flexibly-packaged individual capacitors, the bent portion 113 of one individual positive tab and the bent portion 114 of one individual negative tab of the two flexibly-packaged individual capacitors 1 are embraced with each other to form a two-serial connection terminal of the capacitor module, as shown in FIGS. 11 and 12; and, the bent portions 113 and 114, of the remaining individual positive tab 111 of the first flexibly-packaged individual capacitor 1 and the remaining individual negative tab of the second flexibly-packaged individual capacitor 1, are oppositely arranged to serve as a two-serial positive terminal of the capacitor module and a two-serial negative terminal of the capacitor module, respectively, as shown in FIGS. 10 and 12.

For the hard-shell flexibly-packaged capacitor module consisting of two parallel flexibly-packaged individual capacitors 1 and the hard-shell flexibly-packaged capacitor module consisting of two serial flexibly-packaged individual capacitors 1, the silica gel insulator 2, the fastening plates 3 and the supports 4 adopt the structures described above, referring to FIGS. 1-17, specifically:

The silica gel insulator 2 adopts of the above-described structure of the silica gel insulator 2. It is to be noted that, for the hard-shell flexibly-packaged capacitor module consisting of two parallel flexibly-packaged individual capacitors 1 and the hard-shell flexibly-packaged capacitor module consisting of two serial flexibly-packaged individual capacitors 1, the two flexibly-packaged individual capacitors 1 are arranged in parallel, so the silica gel pads 21 can be arranged between the two flexibly-packaged individual capacitors 1 arranged in parallel and arranged at the outer sides of the two flexibly-packaged individual capacitors 1, so that the close contact of the silica gel insulator 2 with the surfaces of the flexibly-packaged individual capacitors 1 is realized and the heat generated by the flexibly-packaged individual capacitors 1 is quickly transferred to the outside air. The silica gel guard edges 22 are arranged in the above-described way, to provide heat insulation to the ends of the outer layer flexibly-packaged individual capacitors 1.

The fastening plates 3 adapt the above-described structure of the fastening plates 3. It is to be noted that the first hook body 311 and the second hook body 321 are arranged inside the first fastening plate 31 and the second fastening plate 32, respectively, instead of being located on edges of the first fastening plate 31 and the second fastening plate 32. Horizontal extend portions 312 are arranged at upper and lower edges of the first fastening plate 31, i.e., at upper and lower ends of the first fastening plate 31 in FIGS. 15 and 16; and, guide protrusions 322 are arranged at upper and lower edges of the second fastening plate 32, i.e., at upper and lower ends of the second fastening plate 32 in FIG. 15. The first hook body 311 and the second hook body 321 are hooked with each other to mount the fastening plates 3.

Further, to realize the clamping and fixation of the flexibly-packaged individual capacitors 1 inside by the fastening plates 3, the end fixation portions described above are used to solve this problem.

The supports 4 adopt the above-described structure of the supports 4. It is to be noted that, to be convenient for the supports 4 to support and fix the individual positive tabs 111 and the individual negative tabs 112, two parallel tab through holes 411 are formed on each support 4. The bent portions 113 and 114 of the individual positive tabs and the individual negative tabs separately pass through the tab through holes 411, and then extend out from the tab through holes 411.

A metal block 412 is arranged between the two parallel tab through holes 411; the bent portions 113 and 114 of the two individual tabs 11 clasped with each other are superposed with the metal block 412, and the metal block 412 is wrapped in the inner side of the bent portions.

Fixation hole(s) 413 are formed on the metal block 412. The fixation hole(s) 413 correspond to the hole(s) 12 of the two individual tabs 11 that are inserted into each other, and the support 4 is fixed to the individual tabs 11 by passing connector(s) such as bolts or pins through the hole(s) 12 and the fixation hole(s) 413.

In order to realize the reliable fixation of the support 4 and the flexibly-packaged individual capacitors 1, there are preferably two fixation holes 413, two holes 12 are correspondingly formed on the bent portion of each individual tab 11, and the two fixation holes 413 correspond to the positions of the two holes 12 to realize the effective connection and support of the flexibly-packaged individual capacitors 1 by the support 4. The supports 4 also separate the individual tabs 11 from the fastening plates 3 so as to realize the isolation and insulation of the both.

For the serial negative terminal 14 of the capacitor module and the serial positive terminal 15 of the capacitor module, in order to isolate the two electrode terminals, as shown in FIG. 12, two stepped surfaces 415 for accommodating the serial negative terminal 14 and the serial positive terminal 15 may be formed on the support 4. The stepped surfaces 415 are made of an insulating material.

As described above, the flexibly-packaged individual capacitors 1 connected in series or parallel, together with the silica gel insulator 2, the fastening plates 3 and the supports 4, form the hard-shell flexibly-packaged capacitor module, and the capacitor module can be combined according to the specific system voltage level and capacity. As described above, in order to reduce the grouping cost, the 1-parallel to 3-parallel structures and the 1-serial to 3-serial structures are generally used, and the required voltage level and capacity of the capacitor module are realized by the combination of the above-described structures. During the specific combination process, the hard-shell flexibly-packaged capacitor module is assembled as a whole, that is, multiple hard-shell flexibly packaged capacitor modules can be connected in series or in parallel to form the required hard-shell flexibly-packaged capacitor system.

Figure 18:
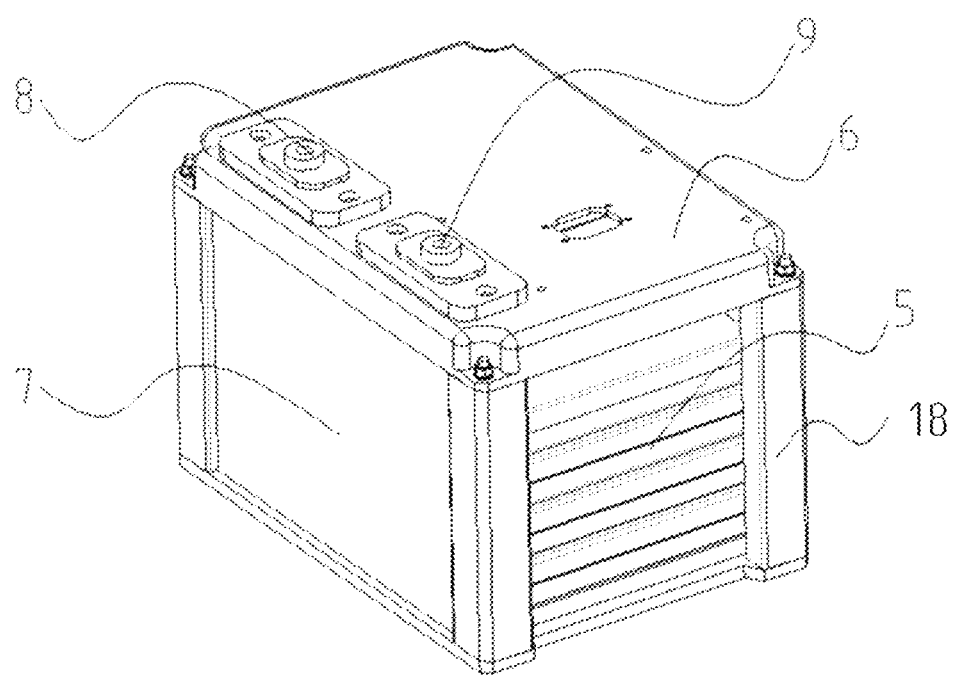
FIG. 18 is a schematic structure diagram of the hard-shell flexibly-packaged capacitor system.
Figure 19:
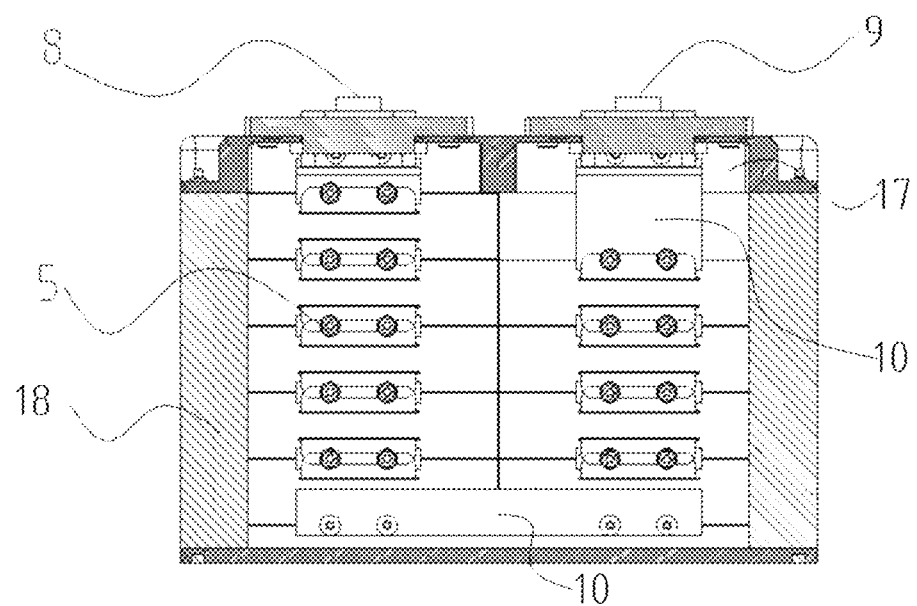
FIG. 19 is a schematic diagram of the internal structure of the hard-shell flexibly-packaged capacitor system.

Another implementation of the present application provides a hard-shell flexibly-packaged capacitor system, including the hard-shell flexibly-packaged capacitor module described above, referring to FIGS. 18 and 19. To realize the structural compactness of the system, when multiple hard-shell flexibly-packaged capacitor modules 5 are assembled, they can be arranged in multiple rows and multiple columns. Referring to FIG. 19, the multiple hard-shell flexibly-packaged capacitor modules 5 are arranged in five rows and two columns. It is easily understood that FIG. 19 merely shows a schematic view of a multi-row and multi-column structure of the multiple hard-shell flexibly-packaged capacitor modules 5, and it shall not be regarded as a unique structure form of the multi-row and multi-column structure.

The hard-shell flexibly-packaged capacitor system further includes a shell and upright columns 18. The shell includes an upper cover plate 6, side plates and a soleplate. The side plates and the soleplate form a lower shell 7, and the upper cover plate 6 can be covered on the lower shell 7. The lower shell 7 is hollow, and the hard-shell flexibly-packaged capacitor modules 5 are assembled in the lower shell 7 and clamped by the upper cover plate 6, so that the accessories such as bolts can be omitted. Consequently, the structure is simple, and it is reliable for clamping and limiting. The upright columns 18 are arranged at four corners of the lower shell 7. The upright columns 18 are slide upright columns. When multiple hard-shell flexibly-packaged capacitor modules 5 are assembled, they can be conveyed to the corresponding positions in the lower shell 7 through the guide effect of the slide upright columns.

To be convenient for the mounting and fixation of the hard-shell flexibly-packaged capacitor modules 5, a groove structure is formed on the hard-shell flexibly-packaged capacitor modules 5, and a limiting block matched with the groove structure is correspondingly arranged in the lower shell 7. During the assembly of the hard-shell flexibly-packaged capacitor modules 5, the groove structure thereof are exactly located at the limiting block of the lower shell 7, and the hard-shell flexibly-packaged capacitor modules 5 are fixed on the lower shell 7, to improve the resistance to shock and vibration of the system.

A system positive output terminal 8 and a system negative output terminal 9 are arranged at an upper end of the upper cover plate 6, which are used for connecting module positive terminals and module negative terminals of the hard-shell flexibly-packaged capacitor modules 5 after connected in series or in parallel. By still taking the hard-shell flexibly-packaged capacitor module 5 consisting of two parallel flexibly-packaged individual capacitors 1 as an example, 2-parallel positive terminals of two capacitor modules are connected in parallel and then connected to the system positive output terminal 8 to serve as a positive interface of the system to the external circuit; and, 2-parallel negative terminals of two capacitor modules are connected in parallel and then connected to the system negative output terminal 9 to serve as a negative interface of the system to the external circuit. By still taking the hard-shell flexibly-packaged capacitor module 5 consisting of two serial flexibly-packaged individual capacitors 1 as an example, two capacitor module 2-serial positive terminals are connected to each adjacent capacitor module 2-serial positive terminal, and the remaining individual positive tabs are connected to the system positive output terminal 8 to serve as a positive interface of the system to the external circuit; and, the remaining individual negative tabs are connected to the system negative output terminal 9 to serve as a negative interface of the system to the external circuit.

When the positive terminals of the capacitor module or negative terminals of the capacitor modules are connected to the system positive output terminal 8 or the system negative output terminal 9, a busbar may be arranged between the capacitor module output terminal and the system output terminal, to facilitate the circuit connection between the both.

If the hard-shell flexibly-packaged capacitor modules 5 in the hard-shell flexibly-packaged capacitor system are of a multi-row structure, for example, a two-row structure shown in FIG. 19, in order to facilitate the connection of terminals in adjacent rows, a copper bar 10 is arranged in the lower shell 7. The copper bar 10 extends across two rows of capacitor modules, and can be directly connected to the positive terminals of the capacitor module or negative terminals of the capacitor module in two adjacent rows, so that the wiring of the capacitor modules is reduced.

Meanwhile, the hard-shell flexibly-packaged capacitor system further includes a slave control board 17 that is connected to the hard-shell flexibly-packaged capacitor modules 5 and monitors the same in real time. The slave control board 17 can on-line monitor the temperature and voltage of the flexibly-packaged individual capacitors in each hard-shell flexibly-packaged capacitor module so as to realize the real-time voltage balance of the individual capacitors.

Finally, it is to be noted that, the foregoing implementations are merely for describing the technical solutions of the present application rather than limiting the present application. Although the present application has been described in detail by the foregoing implementations, it should be understood by a person of ordinary skill in the art that modifications can still be made to the technical solutions recorded in the foregoing implementations or equivalent replacements can be made to some of the technical features. These modifications or replacements do not make the essence of the corresponding technical solutions depart from the scope of the technical solutions of the implementations of the present application.

What is claimed is:

1. A hard-shell flexibly-packaged capacitor module, comprising:
a flexibly-packaged individual capacitor, provided with individual tabs; the individual tabs comprising an individual positive tab and an individual negative tab arranged on two sides;
fastening plates, comprising a first fastening plate and a second fastening plate; the two fastening plates being oppositely mounted, and the two fastening plates being connected in a mutually clasped manner; and,
supports, comprising a first support and a second support; the two supports being oppositely mounted; the two supports being used for connecting the individual positive tab and the individual negative tab, respectively; and the two supports and the two fastening plates being enclosed to form a closed structure for accommodating the flexibly-packaged individual capacitor;
wherein the two fastening plates are connected in a mutually clasped manner, specifically: a first hook body protruding towards the second fastening plate is arranged inside the first fastening plate, a second hook body protruding towards the first fastening plate is correspondingly arranged inside the second fastening plate, and the first hook body and the second hook body can be hooked and clasped with each other;
wherein multiple end fixation portions are arranged on the fastening plates; each end fixation portion at least comprises a first cavity and a second cavity, and two ends of the flexibly-packaged individual capacitors are embedded into the first cavity and the second cavity, respectively; a first protrusion block is arranged at upper and lower ends of the first fastening plate, respectively, and the first cavity is formed between the first protrusion block and the first hook body; and, a second protrusion block is arranged at upper and lower ends of the second fastening plate, respectively, and the second cavity is formed between the second protrusion block and the second hook body.

2. The capacitor module according to claim 1, wherein, the capacitor module comprises multiple flexibly-packaged individual capacitors connected in parallel; bent portions of individual positive tabs of adjacent flexibly-packaged individual capacitors are embraced with each other to form a parallel positive terminal of the capacitor module; and, bent portions of individual negative tabs of adjacent flexibly-packaged individual capacitors are embraced with each other to form a parallel negative terminal of the capacitor module.

3. The capacitor module according to claim 1, wherein, the capacitor module comprises multiple flexibly-packaged individual capacitors connected in series; bent portion of the individual positive tab and bent portion of the individual negative tab of adjacent flexibly-packaged individual capacitors are embraced with each other to form a serial connection terminal of the capacitor module; and, bent portion of a remaining individual positive tab and bent portion of a remaining individual negative tab are back-to-back arranged to serve as a serial positive terminal of the capacitor module and a serial negative terminal of the capacitor module, respectively.

4. The capacitor module according to claim 3, wherein, the capacitor module comprises two flexibly-packaged individual capacitors connected in series; the bent portion of one individual positive tab and the bent portion of one individual negative tab of the two flexibly-packaged individual capacitors are embraced with each other to form a 2-serial connection terminal of the capacitor module; and, the bent portion of the remaining individual positive tab and the bent portion of the remaining individual negative tab of the two flexibly-packaged individual capacitors are back-to-back arranged to serve as a 2-serial positive terminal of the capacitor module and a 2-serial negative terminal of the capacitor module, respectively.

5. The capacitor module according to claim 3, wherein, two stepped surfaces are arranged on one of the supports, for accommodating the serial positive terminal and the serial negative terminal, respectively.

6. The capacitor module according to claim 1, wherein, the capacitor module further comprises a silica gel insulator; wherein, the silica gel insulator comprises heat conducting and insulating silica gel pads and a flame-retardant and insulating silica gel guard edge; the silica gel guard edge is arranged on an outer surface of an end of an outer layer flexibly-packaged individual capacitor; and, the silica gel pads are arranged at two outer surfaces of the outer layer flexibly-packaged individual capacitors and arranged between adjacent flexibly-packaged individual capacitors.

7. The capacitor module according to claim 6, wherein, the silica gel guard edge is arranged on an outer surface of an edge of the outer layer flexibly-packaged individual capacitor; and an embedding opening, through which the edge of the flexibly-packaged individual capacitor is embedded, is formed on the silica gel guard edge; the silica gel guard edge is of a U-shaped structure, and two silica gel guard edges are arranged at two ends of each of the flexibly-packaged individual capacitors.

8. The capacitor module according to claim 1, wherein, a horizontal extend portion is arranged on an edge of the first fastening plate, and a guide protrusion matched with the horizontal extend portion is arranged on an edge of the second fastening plate; and, when the first hook body and the second hook body are hooking with each other, the guide protrusion horizontally move along the horizontal extend portion.

9. The capacitor module according to claim 1, wherein, the supports are made of an insulating material; tab through holes are formed on each support, and bent portions of the individual tabs can pass through the tab through holes and extend out from the tab through holes.

10. The capacitor module according to claim 4, wherein, two stepped surfaces are arranged on one of the supports, for accommodating the serial positive terminal and the serial negative terminal, respectively.

11. The capacitor module according to claim 2, wherein, a horizontal extend portion is arranged on an edge of the first fastening plate, and a guide protrusion matched with the horizontal extend portion is arranged on an edge of the second fastening plate; and, when the first hook body and the second hook body are hooking with each other, the guide protrusion horizontally move along the horizontal extend portion.

12. The capacitor module according to claim 3, wherein, a horizontal extend portion is arranged on an edge of the first fastening plate, and a guide protrusion matched with the horizontal extend portion is arranged on an edge of the second fastening plate; and, when the first hook body and the second hook body are hooking with each other, the guide protrusion horizontally move along the horizontal extend portion.

13. A hard-shell flexibly-packaged capacitor system, comprising a shell, and a hard-shell flexibly-packaged capacitor module arranged inside the shell, wherein the hard-shell flexibly-packaged capacitor module is the capacitor module described in claim 1.

14. The capacitor system according to claim 13, wherein, the capacitor system comprises multiple capacitor modules, arranged in the shell in multiple rows and multiple columns.

15. A hard-shell flexibly-packaged capacitor module, comprising:
 a flexibly-packaged individual capacitor, provided with individual tabs; the individual tabs comprising an individual positive tab and an individual negative tab arranged on two sides;
 fastening plates, comprising a first fastening plate and a second fastening plate; the two fastening plates being oppositely mounted, and the two fastening plates being connected in a mutually clasped manner; and,
 supports, comprising a first support and a second support; the two supports being oppositely mounted; the two supports being used for connecting the individual positive tab and the individual negative tab, respectively; and the two supports and the two fastening plates being enclosed to form a closed structure for accommodating the flexibly-packaged individual capacitor;
 wherein the capacitor module further comprises a silica gel insulator, the silica gel insulator comprises heat conducting and insulating silica gel pads and a flame-retardant and insulating silica gel guard edge; the silica gel guard edge is arranged on an outer surface of an end of an outer layer flexibly-packaged individual capacitor; and, the silica gel pads are arranged at two outer surfaces of the outer layer flexibly-packaged individual capacitors and arranged between adjacent flexibly-packaged individual capacitors.

16. The capacitor module according to claim 15, wherein, the silica gel guard edge is arranged on an outer surface of an edge of the outer layer flexibly-packaged individual capacitor; and an embedding opening, through which the edge of the flexibly-packaged individual capacitor is embedded, is formed on the silica gel guard edge; the silica gel guard edge is of a U-shaped structure, and two silica gel guard edges are arranged at two ends of each of the flexibly-packaged individual capacitors.

\* \* \* \* \*